Jan. 21, 1958  H. L. CROWTHER  2,820,236
STEEL WOOL PAD HOLDER
Filed Aug. 22, 1955
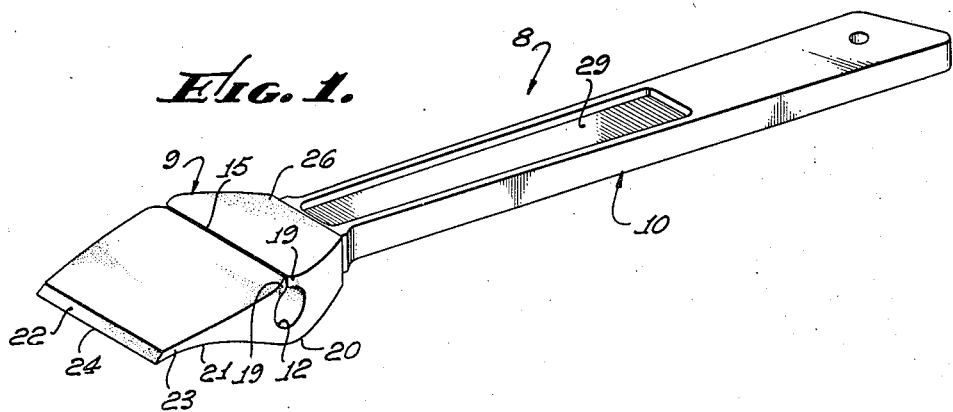
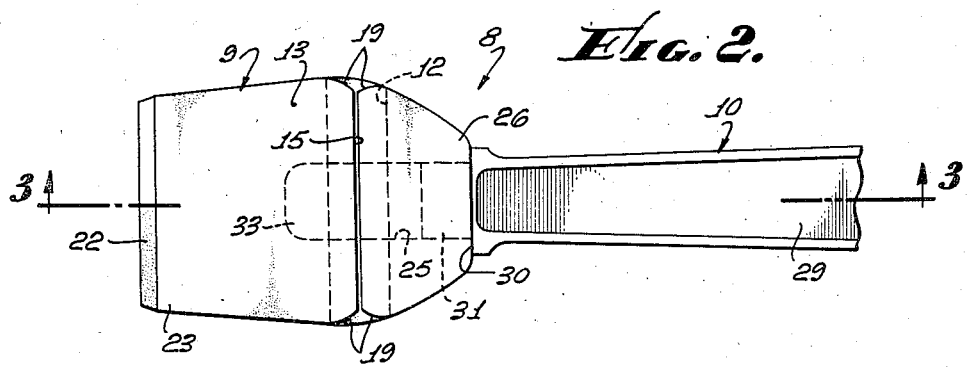
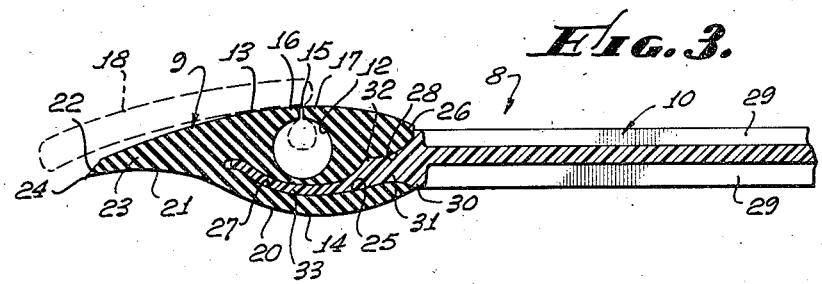
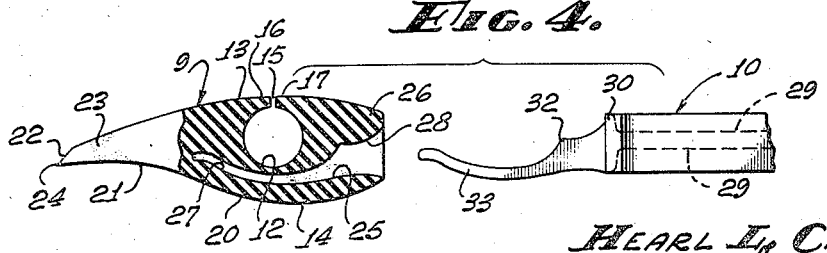
INVENTOR.
HEARL L. CROWTHER
BY
ATTORNEY.

United States Patent Office 2,820,236
Patented Jan. 21, 1958

2,820,236

STEEL WOOL PAD HOLDER

Hearl L. Crowther, San Leandro, Calif.

Application August 22, 1955, Serial No. 529,844

7 Claims. (Cl. 15—209)

This invention relates to scouring pad holders and particularly to a novel improvement on a scouring pad holder disclosed in my co-pending application for U. S. Letters Patent, Ser. No. 490,454, filed February 25, 1955, now Patent No. 2,774,983, issued December 25, 1956.

The scouring pad holder shown in that application has a molded rubber head in the form of a squeegee, there being a lateral passage molded in the head with the material to one side of said passage severed to provide a pair of scouring pad gripping jaws when the rubber of said head is flexed. Said holder also has a handle, one end of which is threaded to screw into an internally threaded hole provided in the rubber head to receive the same. The rubber head of said holder is reinforced by a sheet metal spring embedded in said rubber when the same is molded at the opposite side of said hole from said jaws.

It is an object of the present invention to provide an improved scouring pad holder of the general type disclosed in said co-pending application which does not require the rubber head thereof to be molded with a metal spring embedded therein.

Another object of the invention is to provide an improved scouring pad holder of the general type shown in said application in which the rubber head of the holder is molded to provide a pocket for receiving a spring member for resiliently reinforcing said head and in which said spring member is secured upon the handle to provide a means for uniting the handle with the head.

A further object of the invention is to provide such a novel improved scouring pad holder in which said handle and spring member comprise a unitary element molded of plastic material.

The scouring pad holder shown in said copending application employed serrated jaws for gripping the scouring pad. While such jaws were quite effective in holding the pad, they required the jaws to be opened rather widely to permit the admission of the pad between the jaws.

It is yet a further object of the invention to provide a novel improved scouring pad holder of the general type above discussed in which the pad may be inserted, by a quick easy movement, into position between the jaws of the holder with said jaws sprung apart a relatively short distance.

The manner of accomplishing the foregoing objects as well as further objects and advantages will be made manifest in the following description taken in connection with the accompanying drawing in which Fig. 1 is a perspective view of a preferred embodiment of the invention.

Fig. 2 is an enlarged plan view of the head and a portion of the handle of the scouring pad holder shown in Fig. 1.

Fig. 3 is a longitudinal sectional view taken on the line 3—3 of Fig. 2 and showing the manner in which a spring member formed integral with said handle is inserted into a pocket of like shape provided in the rubber head of the holder for uniting the handle and the head and provides spring support for said head when the latter is flexed to open the mouth thereof for receiving an edge of a steel wool pad in said mouth. The outline of a steel wool pad as when the same is held between said jaws is illustrated by broken lines in this view.

Fig. 4 is a view similar to Fig. 3 and shows the spring member of the handle withdrawn from said pocket to separate the handle from the head of the invention.

Referring specifically to the drawings the preferred embodiment 8 of the invention there illustrated includes a head 9 and a handle 10.

The head 9 is formed of a resilient material, preferably molded rubber, and in the molding of this head it is formed to have a hole 12 extending laterally therethrough, this hole being closer to an upper surface 13 of said head than to a lower surface 14 thereof. A slot 15 is formed in the head 9 when molding the same which is parallel with the hole 12 and completely severs the material of the head 9 lying between the hole 12 and the surface 13. Jaws 16 and 17 are thus formed on opposite sides of said slot for the purpose of gripping one edge of a scouring pad 18 which is shown in broken lines in Fig. 3.

Opposite end portions 19 of the jaws 16 and 17 are bevelled inwardly towards the slot 15 to produce a flare in the opposite ends of said slot to assist in the introduction of an edge of scouring pad 18 into said slot by a movement parallel with the hole 12.

The upper surface 13 of the head 9 is convex and is formed with a cylindrical curvature having an axis which is parallel with the hole 12 and disposed below the head 9. The bottom surface 14 of the head 9 has a convex portion 20 which is in the form of a segment of a cylinder with an axis parallel with the hole 12 and disposed above the head 9. The surface 14 also has a concave portion 21 which has the form of a segment of a cylinder with an axis which is parallel with the hole 12 and disposed below the head 9. The forward extremities of the surfaces 13 and 14 are joined by a bevelled face 22 which combines with surfaces 13 and 14 to form a relatively thin squeegee 23 having a straight sharp edge 24 at the forward extremity of the head 9.

The head 9 is molded with a pocket 25 therein which is employed for mounting the head 9 on the handle 12. This pocket extends forwardly from the rear or butt end 26 of the head 9 along a curved path and through the material of the head lying between the hole 12 and the face 14 thereof. The pocket 25 has a relatively thin arcuate portion 27 in the form of a segment of a cylindrical surface, the axis of which is parallel with the hole 12 and disposed above said hole. Said pocket also has an outer mouth portion 28 which is substantially larger in cross section than the portion 27 thereof.

The handle 10 preferably comprises a unitary element molded from plastic material so as to be relatively rigid. The handle 10 has hollows 29 for lessening the weight of said handle and terminates at its front end in a shoulder 30 from which a relatively thick attaching member 31 extends forwardly, said member having an upwardly turned hook 32 and terminating in a relatively thin plastic spring 33.

The head 9 and handle 10 of the scouring pad holder 8 are joined together by the insertion of the member 31 in the pocket 25, this member filling the mouth portion 28 of said pocket and the spring 33 at the extremity of said member extending into and conforming to and substantially filling the arcuate inner portion 27 of said pocket. The pocket 25 molded in the head 9 has substantially identically the same shape as the attaching member 31 and the spring 33, but receives said member and spring snugly so that the insertion of said member and spring into said pocket effectively unites the head 9 with the handle 10 so that said head will not accidentally be separated from said handle in all the normal uses to be made of the holder 8. In other words, after the head 9 and handle are assembled as above noted and shown in Figs. 1, 2 and 3 of the drawing they can be separated only by a deliberate application of substantial force directed towards pulling the member 31 from the pocket 25. The head 9 and handle 10 are shown in Fig. 4 in the relationship we have just described prior to the insertion of the member 31 into the pocket 25 and just after the withdrawal of said member from said pocket. In all normal use of the holder 8, the head 9 and handle 10 are assembled together as shown in Figs. 1, 2 and 3.

The holder 8 is primarily provided for the holding of a scouring pad 18 in the manner shown in Fig. 3 for applying this in scouring pots and pans requiring abrasive action in the cleaning of the same. The object of the holder 8 is to save the hands from direct contact with the steel wool in the scouring pad 18 which tends to break off and penetrate the skin when the pad is directly applied to a pot with the hands.

The pad 18 may be inserted between the jaws 16 and 17 by gripping the squeegee 23 in one hand, holding the pad 18 in the other hand and pressing the handle 10 against the body so as to flex the material of the head 9 and the spring 32 and separate the jaws 16 and 17 to allow an edge portion of the pad 18 to be inserted into one end of the slot 15 by a movement of the pad parallel with the hole 12. The flared ends 19 of the jaws 16 and 17 help guide the pad 18 into the slot 15 which, of course, is substantially widened at this time by the flexing of the head 9. When the edge of scouring pad 18 has been thus inserted between the jaws 16 and 17 the pressure on the tip of the head 9 is relaxed, allowing these jaws to come together in gripping relation with the pad 18. The pad is then bent forwardly so as to overlie the forward portion of the convex surface 13 of the head 9 as shown in Fig. 3, and is in readiness for a scouring operation.

By manipulation of the handle 10, the scouring pad 18 may now be applied to any surface needing to be scoured. The pressure applied by the head 9 to the pad 18 to effect this scouring action is yieldable due to the highly flexible character of the squeegee 23 of the head through which the pad is applied to the surface being cleaned. Where it is desired to apply the scouring pad 18 to a corner in a pot this can be done by pressing the outer edge of the pad 18 into said corner with said pad backed up by the squeegee edge 24 of the head 9.

The scouring pad holder 8, is, of course, adapted to function without any scouring pad applied thereto, as a squeegee for scraping soft food particles from dishes, pots and pans.

From the foregoing description it is believed manifest that I have provided in my improved scouring pad holder herein disclosed, a simplified design economical of manufacture which attains all of the objects recited in the preamble hereto. In the present invention it is unnecessary to mold a spring integral with the rubber head of the holder. This is because the spring member of the invention is made of plastic and is molded as an integral part of the plastic handle of the holder. The provision of threads on molded parts adds to the cost of these parts. In the production of the present invention, threads are eliminated from the two molded parts comprising the invention, thereby lowering the cost of manufacture thereof.

Another advantage of the present invention derives from the straight line edges on the jaws for gripping the scouring pad thus reducing to a minimum the distance which the jaws must be separated to permit the admission of an edge portion of a scouring pad therebetween. A new technique of introducing the pad is also provided by the present invention in which end portions of the slot forming the gripping jaws are flared to guide the scouring pad between the jaws when the scouring pad is moved longitudinally relative to the jaws in introducing the same.

While only a single embodiment of the invention is herein disclosed, it is to be understood that various changes and modifications may be made in this without departing from the spirit of the invention or the scope of the appended claims.

I claim:

1. In a scouring pad holder, the combination of: a head of molded rubber forming a resilient backing for a scouring pad, there being a hole extending transversely through said head, said hole lying closer to one face of said head than to the opposite face, the rubber of said body between said hole and the closer of said faces being broken by a slot substantially coextensive with the length of said hole to form a pair of juxtaposed jaws between which a scouring pad may be gripped when said body is deformed to admit said pad between said jaws and then released, said head having a pocket formed therein when said head is molded, said pocket lying in a plane perpendicular to said hole and being curved about an axis parallel with said hole, said pocket extending between said hole and said opposite face of said head, and opening from an edge of said head parallel with said hole; a spring member having a shape similar to that of said pocket and adapted to be inserted in said pocket after said rubber head is molded for reinforcing said head when the latter is flexed to separate said jaws for the insertion of a scouring pad therebetween; and a handle, said spring member being connected directly to said handle and comprising a means for securing said handle to said head.

2. A combination as in claim 1 in which said spring member and said handle comprise a unitary plastic casting.

3. In a scouring pad holder, the combination of: a head of molded rubber having a relatively thick butt end, said head forming a resilient backing for a scouring pad, there being a hole extending transversely through said head, said hole lying closer to one face of said head than to the opposite face, the rubber of said body between said hole and the closer of said faces being broken by a slot substantially coextensive with the length of said hole to form a pair of juxtaposed jaws between which a scouring pad may be gripped when said body is deformed to admit said pad between said jaws and then released, there being a pocket molded in said head which enters the butt end of said head and extends past said hole between the latter and said opposite face of said head; and a spring member having a shape similar to that of said pocket and adapted to be inserted in said pocket after said rubber head is molded for yieldably reinforcing said head when the latter is flexed to separate said jaws for the insertion of a scouring pad therebetween.

4. A combination as in claim 3 including a handle, said spring member being connected directly to said handle and comprising means for securing said handle to said head.

5. A combination as in claim 4 in which said head comprises a relatively flat wedge shaped squeegee lying substantially in the plane of said handle, and tapering to an edge lying in said plane at the extremity of said head.

6. A combination as in claim 4 in which a relatively thick attaching member is provided on said handle to extend forwardly therefrom and unite at its extremity with said spring member, said attaching member having a hook formed thereon, and in which a mouth portion of said pocket is molded to fit and snugly receive said attaching member and hook, whereby substantial resistance is set up to the inadvertent removal of said attaching member and spring member from said pocket.

7. A combination as in claim 6 in which said spring member and the portion of said pocket receiving the same are arcuately formed about an axis parallel with said hole, with the latter located between said pocket and said axis, and with said hook located on the concave side of said spring member.

References Cited in the file of this patent

UNITED STATES PATENTS

| | | |
|---|---|---|
| 1,958,408 | Jelliffe | May 15, 1934 |
| 2,155,462 | Anderson | Apr. 25, 1939 |
| 2,219,753 | Seguin | Oct. 29, 1940 |
| 2,280,556 | Stromgren | Apr. 21, 1942 |
| 2,677,842 | Sherwin | May 11, 1954 |
| 2,774,983 | Crowther | Dec. 25, 1956 |

FOREIGN PATENTS

| | | |
|---|---|---|
| 77,611 | Norway | Oct. 23, 1950 |
| 600,761 | Great Britain | Apr. 19, 1948 |